UNITED STATES PATENT OFFICE.

EMILIO SONCINI, OF MILAN, ITALY, ASSIGNOR OF ONE-HALF TO SOCIETÀ DI ESPORTAZIONE POLENGHI LOMBARDO, OF MILAN, ITALY.

PREPARATION OF CASEIN.

No. 905,943.

Specification of Letters Patent.

Patented Dec. 8, 1908.

Application filed January 24, 1907. Serial No. 353,892.

*To all whom it may concern:*

Be it known that I, EMILIO SONCINI, a subject of the King of Italy, residing in Milan, Italy, 15 Via Andrea Appiani, have invented certain new and useful Improvements in the Preparation of Casein, of which the following is a specification.

This invention relates to the treatment of milk to precipitate the casein contained therein and has particular reference to a process of preparing casein by the addition of sulfur dioxid to skimmed milk.

In the practice of my process I add from about 200 to 300 grams of gaseous sulfur dioxid to every 100 liters of milk and separate the casein thus precipitated, from the whey. The sulfur dioxid may be added either in a gaseous form as above referred to, or in an aqueous solution.

By the use of sulfur dioxid the casein is not only more advantageously precipitated than by prior methods but the whey will keep fresh for a long time.

Having thus described my invention, I claim:

The herein described process which consists in adding sulfur dioxid to skimmed milk until the casein contained therein is precipitated, and separating the precipitate thus formed from the whey, substantially as described.

In witness whereof I have hereunto set my signature in the presence of two witnesses.

EMILIO SONCINI.

Witnesses:
GIDIO LONEHEET,
B. CARLO SALVOTI.